US005751975A

United States Patent [19]
Gillespie et al.

[11] Patent Number: 5,751,975
[45] Date of Patent: May 12, 1998

[54] METHOD AND APPARATUS FOR INTERFACING A DEVICE COMPLIANT TO A FIRST BUS PROTOCOL TO AN EXTERNAL BUS HAVING A SECOND BUS PROTOCOL AND FOR PROVIDING VIRTUAL FUNCTIONS THROUGH A MULTI-FUNCTION INTELLIGENT BRIDGE

[75] Inventors: Byron Gillespie, Phoenix; Marc Goldschmidt, Tempe; Terry Sych, Gilbert, all of Ariz.; Bruce Young, Tigard, Oreg.

[73] Assignee: Intel Corporation, Santa Clara, Calif.

[21] Appl. No.: 580,130

[22] Filed: Dec. 28, 1995

[51] Int. Cl.$^6$ .............................. G06F 13/00; G06F 13/10
[52] U.S. Cl. ....................... 395/306; 395/309; 395/500; 370/402
[58] Field of Search ................................. 395/306–309, 395/280, 281, 500; 370/401–402

[56] References Cited

U.S. PATENT DOCUMENTS

| 5,086,426 | 2/1992 | Tsukakoshi et al. | 370/405 |
|---|---|---|---|
| 5,311,576 | 5/1994 | Brunson et al. | 379/89 |
| 5,392,407 | 2/1995 | Heil et al. | 395/293 |
| 5,446,868 | 8/1995 | Gardea, II | 395/500 |
| 5,446,869 | 8/1995 | Padgett et al. | 398/500 |
| 5,542,056 | 7/1996 | Jaffa et al. | 395/306 |
| 5,548,730 | 8/1996 | Young et al. | 395/280 |
| 5,564,026 | 10/1996 | Amini et al. | 395/308 |
| 5,568,619 | 10/1996 | Blackledge et al. | 395/281 |
| 5,574,869 | 11/1996 | Young et al. | 395/306 |
| 5,581,714 | 12/1996 | Amini et al. | 395/308 |

*Primary Examiner*—Gopal C. Ray
*Attorney, Agent, or Firm*—Blakely, Sokoloff, Taylor & Zafman

[57] ABSTRACT

A method and apparatus for interfacing a device which is compliant to a first bus protocol to a second bus having a second protocol and for providing virtual functions through an intelligent bridge. The interface apparatus is coupled to the first bus and the second bus. The interface device detects a configuration cycle on the second bus and translates the configuration cycle into a corresponding cycle in a format understandable by the first bus. The bus cycle is executed on the first bus. A local processor is interrupted by the interface apparatus. A verification and correction program is executed by the local processor to restore configuration header values if the executed bus cycle violated the protocol of the second bus. The interface apparatus insures that requests for access to the first bus are blocked during the execution of the verification and correction program.

11 Claims, 10 Drawing Sheets

WRITE ENABLE SIGNAL 59 GENERATION

METHOD AND APPARATUS FOR INTERFACING A DEVICE COMPLIANT TO A FIRST BUS PROTOCOL TO AN EXTERNAL BUS HAVING A SECOND BUS PROTOCOL AND FOR PROVIDING VIRTUAL FUNCTIONS THROUGH A MULTI-FUNCTION INTELLIGENT BRIDGE

BACKGROUND OF THE INVENTION (1) Field of the Invention

The subject invention generally relates to computer devices, and, in particular to multi-function intelligent bridge devices.

(2) Prior Art

FIG. 1 illustrates a prior art computer system having a number of different devices. In this computer system, a first PCI compliant device (e.g., a SCSI Controller made by a first company, COMPANY1) is coupled to a primary PCI bus. A PCI to PCI bridge provides an interface between the primary PCI and a secondary PCI bus. Another PCI compliant device (e.g., a second SCSI Controller made by a second company, COMPANY2) is coupled to this secondary PCI bus.

A PCI to local processor bus bridge (e.g., a PLX 9036 or 9060 manufactured by PLX Technologies, Inc.), coupled to the primary bus, provides an interface between the primary PCI bus and a local processor bus. A SCSI Controller (made by a third company, COMPANY3) is coupled to the local processor bus and compliant with the local processor bus protocol. However, the SCSI Controller made by COMPANY3 is not PCI compliant.

There are several disadvantages of this computer system. First, each of the three SCSI Controllers in this example requires a separate driver (i.e., these devices are controlled by different instructions, defined by a specific command set for each controller). For example, COMPANY1's SCSI Controller is bundled with a COMPANY1 driver; COMPANY2's SCSI Controller is bundled with its own separate COMPANY2 driver, and COMPANY3's SCSI Controller has its unique COMPANY2 driver. A particular driver only controls the device associated with that drier. Conversely, a particular device only understands the driver associated with that device. Although the device may perform similar functions, a driver from one hardware vendor is specific to devices made by that vendor. For example, even though the SCSI controllers made by COMPANY1 and COMPANY2 are both PCI compliant devices, COMPANY2's SCSI Controller does not understand the instructions used by the driver for COMPANY1's SCSI Controller and vice-versa.

Second, the prior art bridge (e.g., PLX 9036) chip only translates PCI bus cycles into local processor bus cycles and vice-versa. For instance, the PLX 9036 includes configuration registers accessible to a host processor when the host processor initiates a configuration cycle to the PLX 9036. However, devices, coupled to the local processor bus, are not true PCI devices. For example, the SCSI Controller made by COMPANY3 is not PCI compliant, nor is it even recognized in the PCI address space.

In addition, to couple a device to the PCI bus (primary or secondary) in the prior art computer system, (i.e., to make the device PCI-compliant) requires a complex interface circuit. Typically, this interface circuit is an application specific integrated circuit (ASIC) that implements the electrical requirements, the bus protocol requirements, and the configuration space, as set forth in the PCI Bus Protocol. This interface circuit, which is typically integrated into an Application Specific Integrated Circuit (ASIC), is generally expensive to design and manufacture, and it consumes physical space, either on a baseboard or on an I/O card.

Accordingly, there is a need for a method and apparatus, embodied in a multi-function intelligent bridge device, that interfaces a non PCI compliant device to a PCI bus and for emulating a virtual function to the PCI bus so, that a non compliant PCI device, manufactured by one company, may be controlled by a driver of a PCI compliant device, manufactured by a different company.

BRIEF SUMMARY OF THE INVENTION

In accordance with one aspect of the invention, a method and apparatus for interfacing a non PCI-compliant device to a PCI bus via a multi-function intelligent bridge device is provided. The PCI bus protocol requires a defined set of configuration registers for all functions that reside on the bus. The present invention provides a method and apparatus to map PCI configuration address space for a multi-function PCI device directly into the address space of another, more conventional, bus on the back-side of the multi-function device. The present invention allows registers on the back-side bus to be mapped into the PCI configuration space for any of the eight functions that may exist in a single multi-function PCI "device," as defined by the PCI bus protocol.

An address translator is coupled between the PCI bus and a local processor bus for translating PCI addresses into local processor addresses and vice versa. A device select detection circuitry, coupled to the primary PCI bus, for detecting that a configuration cycle on the PCI bus is for that particular device is provided. Upon detecting that the current configuration cycle is for that device, this device select detection circuitry notifies a configuration controller. This configuration controller disables the address translator so that accesses by a bus master on the primary PCI bus are blocked. The configuration controller also signals an interrupt generator to generate an interrupt to a local processor, which is coupled to the local processor bus. The configuration controller also commands a retry generator to assert PCI retry cycles onto the PCI bus in the event that a host or any other PCI bus master on the PCI bus attempts an access to the local processor bus.

In accordance with another aspect of the invention, a method and apparatus for providing virtual functions in a PCI multi-function device is provided. A local processor, coupled on the local processor bus, is enabled by emulation software, to emulate other existing PCI devices.

In an exemplary implementation, the PCI multi-function device is an Intel 80960 RP chip (herein referred to as the "P2P"). Whenever the P2P sees a configuration cycle with its IDSEL# asserted, the P2P maps the configuration cycle into memory addresses on the local processor bus. A memory controller, coupled to the local bus, decodes the offset in configuration space and responds accordingly for a selected function (i.e., writes and reads the appropriate hardware map of the configuration space for a particular function). The memory controller then interrupts the local processor, which in turn reads the configuration space and responds accordingly. A local memory, coupled to the local processor bus, stores emulation software for translating a command set of one PCI device to a command set of an alternative and different PCI device. Moreover, this local memory contains additional software that insures certain protected portions of the configuration space for a particular function (i.e., the 256 byte hardware map for each function) are not overwritten by a host processor or other PCI master on the primary PCI bus. The local processor (e.g., the Intel 80960 JF) is allowed to write to any portion of the 2 Kbyte window of configuration space since it is emulating a virtual PCI function. However, if a host processor has written to a protected portion of the configuration space, the local processor, executing this correction software, restores the proper values (i.e., previous values) to the configuration space.

Also, in an exemplary embodiment, software code stored in the local memory, provides the proper handshake signals to the primary PCI bus to complete an instruction or command.

Hence, the invention provides a method and apparatus for interfacing a non PCI-compliant device to a PCI bus and also provides a method and apparatus for providing virtual functions via the PCI multi-function device. Other features and advantages of the invention would be apparent from the detailed description below and the attached drawings.

BRIEF DESCRIPTION OF THE DRAWINGS

The present invention may be understood more fully from the detailed description given below and from the accompanying drawings of the preferred embodiments of the invention which, however, should not be taken to limit the invention to the specific embodiment but are for explanation and understanding only.

DETAILED DESCRIPTION OF THE INVENTION

Referring to the figures, exemplary embodiments of the invention will now be described. The exemplary embodiments are provided to illustrate the aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
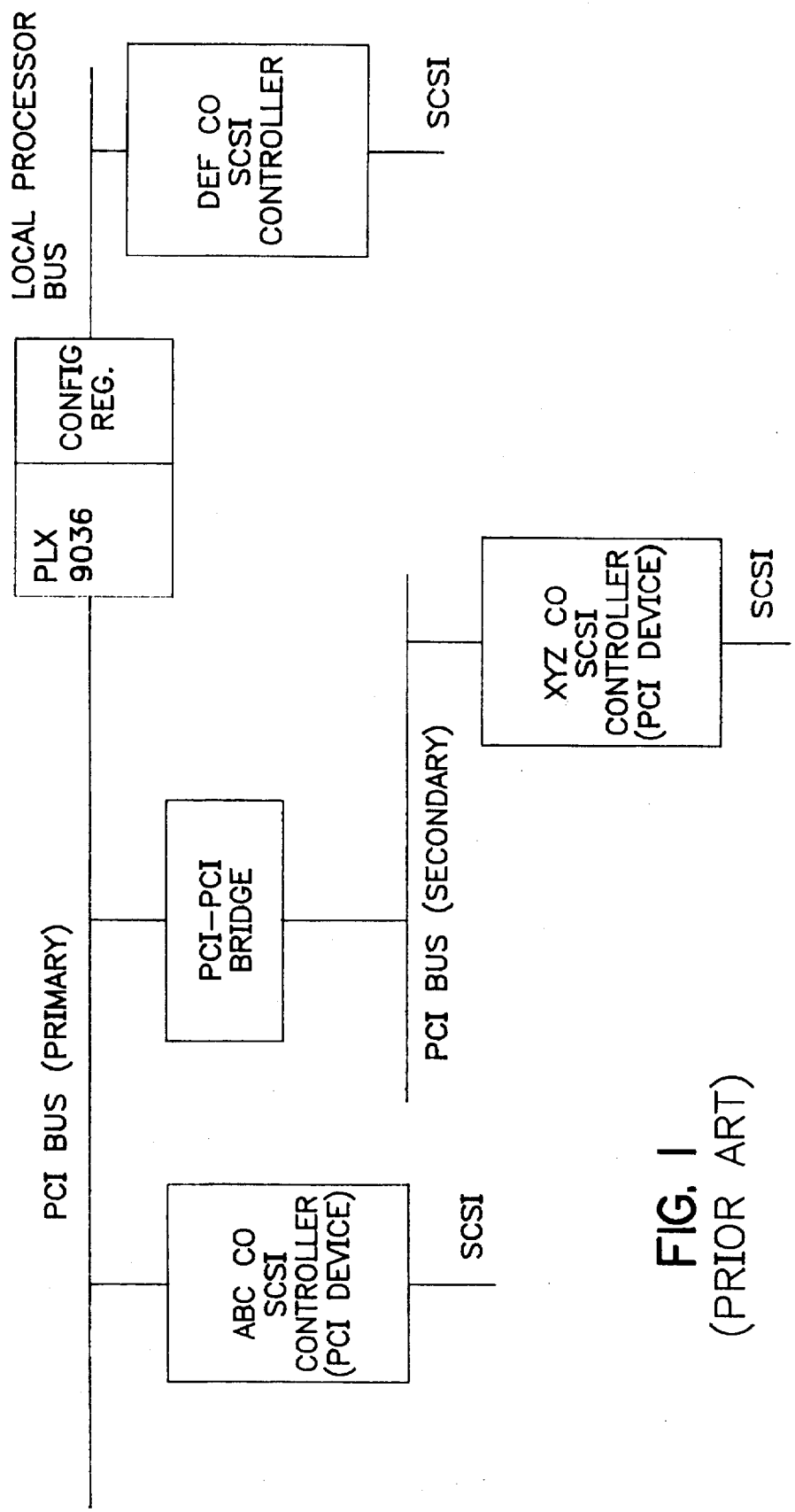
FIG. 1 illustrates a prior art computer system.
Figure 2:
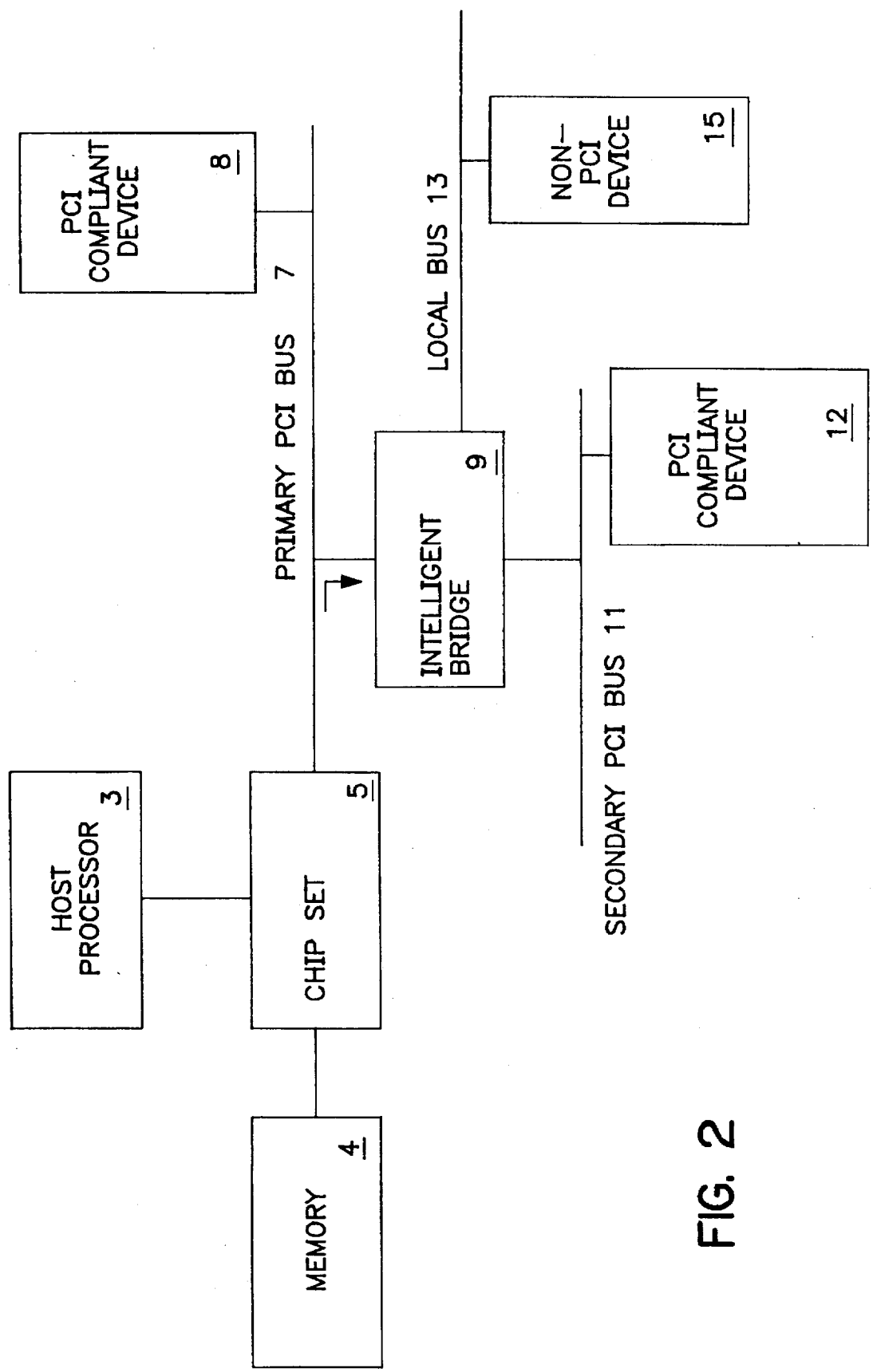
FIG. 2 is a block diagram illustrating a computer system in which the present invention may be implemented.

FIG. 2 illustrates a block diagram of a computer system in which the teachings of the present invention may be implemented. A host processor 3 is coupled to a chip set 5 that includes a memory controller, a cache controller, and a host bus to PCI bus bridge. A main memory (e.g., DRAMs) 4 is provided for storing programs that are executed by the host processor 3. The main memory 4 is coupled to the chip set 5, and accesses to main memory 4 are controlled by the memory controller in the chip set 5.

The chip set 5 is coupled to a primary PCI bus 7. This primary PCI bus 7 can accommodate a number of PCI compliant devices, such as device 8. An intelligent bridge 9 (e.g., Intel 80960 RP chip, herein referred to as a "P2P") is coupled to the primary PCI bus 7 and a secondary PCI bus 11. The P2P provides a number of functions to the computer system (i.e., the P2P is a multi-function PCI device). First, the P2P 9 translates PCI bus cycles on the primary PCI bus 7 into corresponding PCI cycles on the secondary PCI bus 11 and vice-versa. Second, the P2P 9 translates PCI bus cycles into local processor bus 13 cycles and vice-versa via an address translator, which will be described in further detail hereinafter. The P2P 9 also includes a processor dedicated to handling input and output (I/O) operations. The P2P chip also includes a local bus 13 (e.g., the Intel 80960 processor bus). A non PCI compliant device 15 may be coupled to the local processor bus 13.

The secondary PCI bus 11 also includes a plurality of PCI compliant devices, such as device 12.

Figure 3:
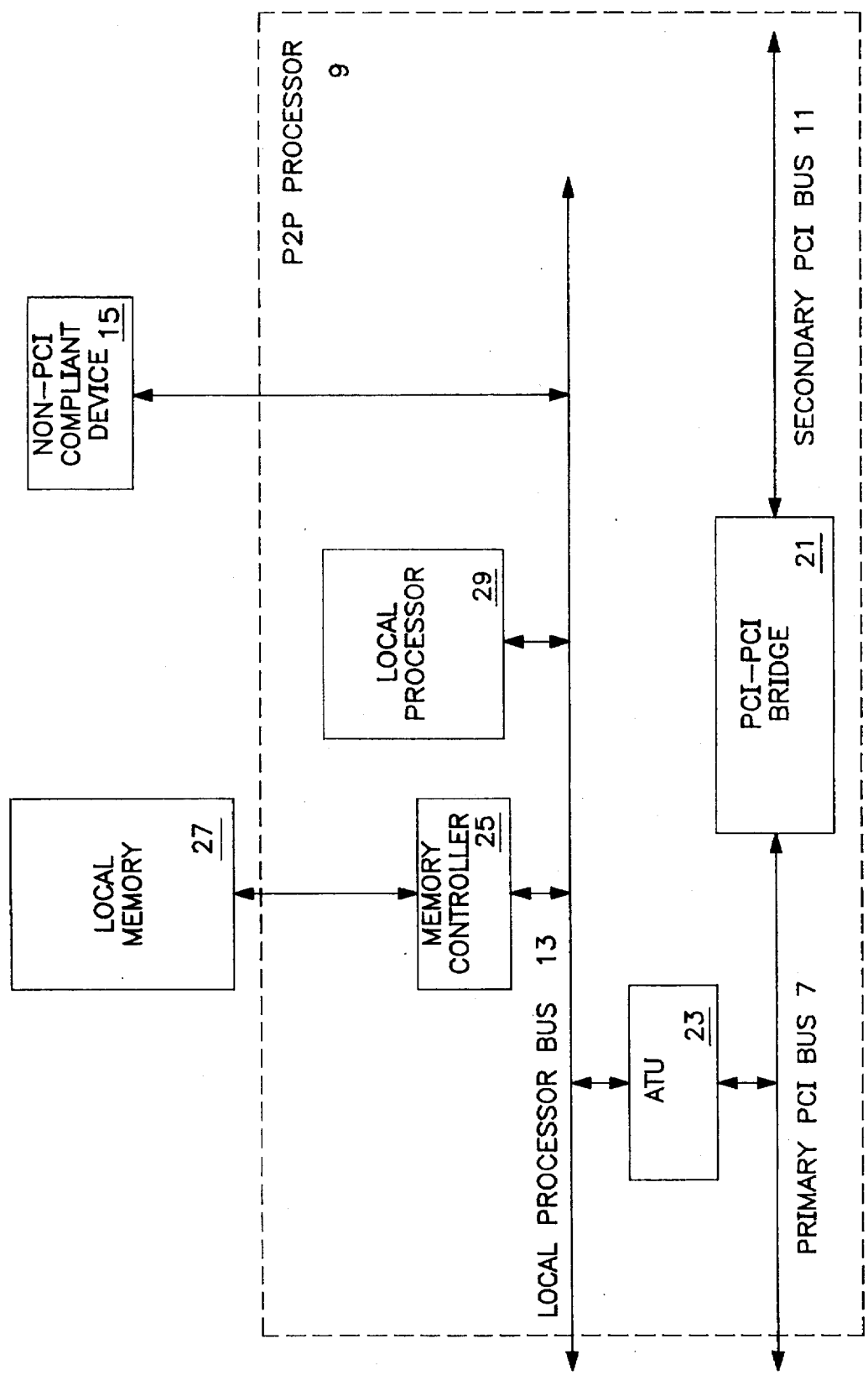
FIG. 3 is a block diagram illustrating the components of a multi-function PCI compliant device.

FIG. 3 illustrates in block diagram fashion the key components of the P2P 9, as they relate to the present invention. As noted previously, a PCI to PCI bridge 21 couples the primary PCI bus 7 to the secondary PCI bus 11. Moreover, the PCI to PCI bridge 21 translates PCI bus cycles on the primary PCI bus 7 into bus cycles on the secondary PCI bus 11 and vice versa. In the 2 Kbyte configuration space assigned to the P2P 9, the PCI to PCI bridge 21 is allotted 256 contiguous bytes (corresponding to function 0) within the 2 Kbyte window.

An Address Translation Unit (ATU) 23, which is typically function 1 when the P2P processor 9 is configured, couples the primary PCI bus 7 to the local processor bus 13. A Memory Controller 25 couples a local memory 27 to the local processor bus 13 and controls memory accesses to and from local memory 27.

A local processor 29 (e.g., Intel 80960 JF) is also coupled to the local processor bus 13. This local processor 29 executes programs stored in the local memory 27 and typically has a specific operating system that is tailored for handling an input/output (I/O) command set (i.e., I/O instructions).

As noted previously, a non-compliant PCI device 15 may be coupled to local processor bus 13. Although this device 15 must be compliant with the protocol of the local processor bus 13 (e.g., compliant with the Intel 80960 Processor Bus Protocol), the present invention enables this non PCI compliant device 15 to function and appear as a PCI compliant device to the host processor 3 and any other PCI bus master on the primary 7 or secondary PCI bus 11.

Figure 4:
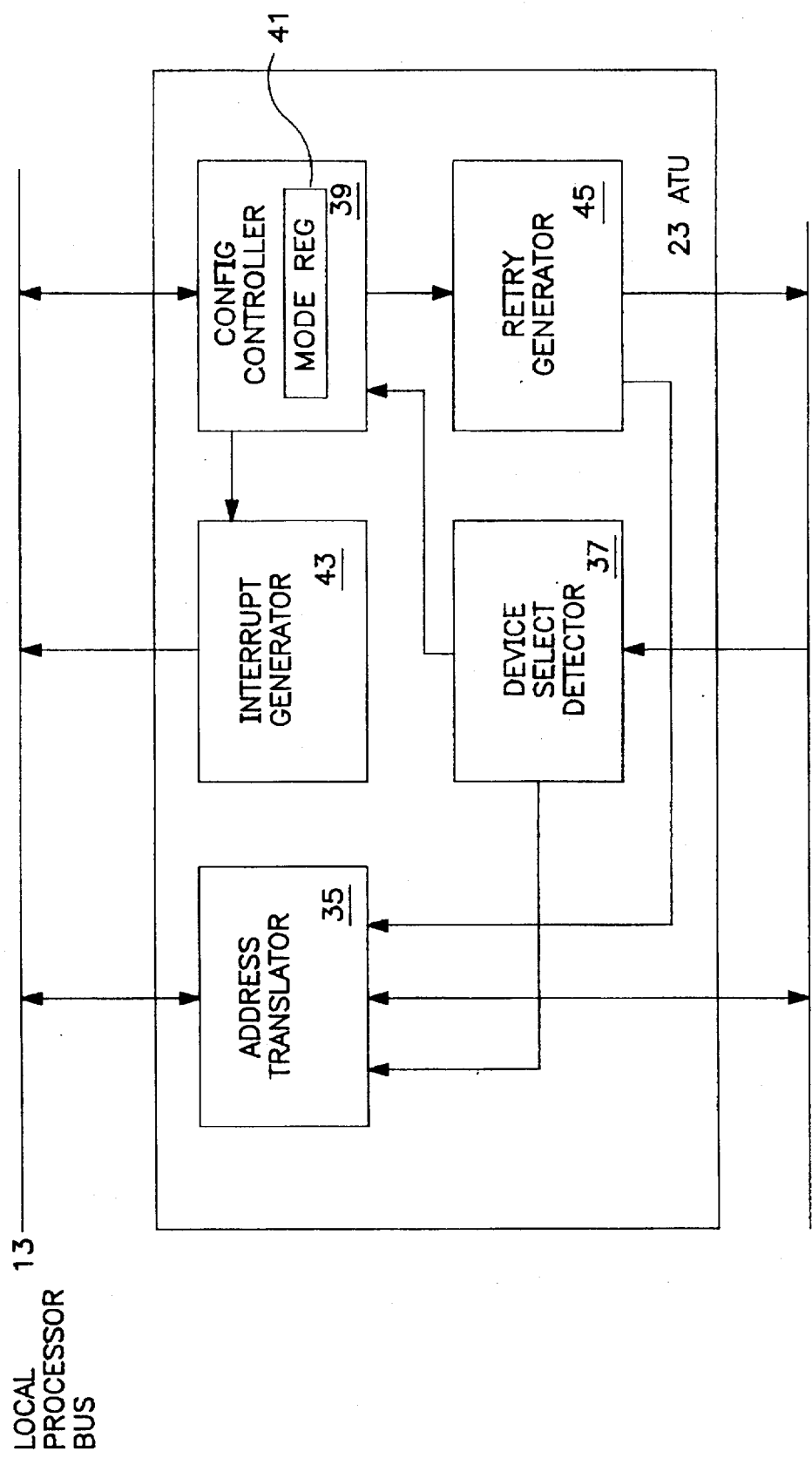
FIG. 4 illustrates one embodiment of the present invention.

FIG. 4 illustrates one embodiment of the present invention, where the key aspects of the present invention are implemented in the ATU 23.

In this embodiment, the ATU 23 includes an Address Translator 35 that translates PCI bus cycles from the primary PCI bus 7 to the local processor bus 13 and vice versa. Often, this translation process is simply replacing the upper bits of the address of a bus cycle on the primary PCI bus.

The present invention, as implemented in the ATU 23, also includes a Device Select Detector 37, coupled to the primary PCI bus 7, for receiving an IDSEL# signal and the lower two bits of the address (i.e., AD[1:0]) from the primary PCI bus 7. If the IDSEL# signal is asserted, and the lower two address bits are 00 (i.e., AD[1:0]=00), the P2P 9 recognizes that the current PCI configuration cycle is for that device.

Upon detecting that the PCI configuration cycle is for the P2P 9, the Device Select Detector 37 notifies a Configuration Controller 39 that the P2P 9 is selected. The Device Select Detector 37 also writes a predetermined bit pattern to a Mode Register 41. This bit pattern indicates to the local processor 29 that the host processor 3 has initiated this present PCI configuration cycle. The Device Select Detector 37 also disables the Address Translator 35 so that addresses from the primary PCI bus 7 are not translated into addresses in the local processor bus 13 until the Address Translator 35 is enabled again.

The Configuration Controller 39 controls an Interrupt Generator 43. The Interrupt Generator 43, coupled to the local processor bus 13, generates an interrupt to the local processor 29. Configuration controller 39 also controls the Retry Generator 45. The Retry Generator 45 asserts a retry cycle on the primary PCI bus 7 so that a local processor has sufficient time to check the status of the configuration registers of the P2P 9 and verify that only the authorized bits were changed.

If it is determined by the local processor that certain protected fields in the configuration space have been altered by the host processor in violation of the PCI configuration space hardware map protocol, as defined in the PCI Bus Protocol Release 2.1, the local processor executes correction software that is resident in local memory 27.

The PCI Bus Protocol defines the organization of configuration space registers for every PCI compliant device and imposes a specific record structure or template (i.e., hardware map) on the 256-byte space for each device function. This configuration space is divided into a predefined header region and a device dependent region. The device dependent region includes device specific information. The PCI compliant device implements those registers that are necessary and relevant to that application.

The predefined header region includes fields that uniquely identify the device and allow the device to be generically controlled. The predefined header portion of the configuration space is divided into two portions. The first 16 bytes are defined the same for all types of devices. The remaining bytes can have different layouts depending on the base function that the device supports. A Header Type field (located at offset 0Eh) defines which particular layout is provided.

All PCI compliant devices treat configuration space write operations to reserved registers as No-Ops. In other words, the access is completed normally on the bus, and the data is discarded. Read accesses to reserved or unimplemented registers are completed normally, and a data value of 0 is returned.

TABLE 1

| Device ID | | Vendor ID | 00h |
|---|---|---|---|
| Status | | Command | 04h |
| | Class Code | Revision ID | 08h |
| BIST | Header Type | Latency Timer | Cache Line Size | 0Ch |
| Base Address Registers | | | 10h |
| | | | 14h |
| | | | 18h |
| | | | 1Ch |
| | | | 20h |
| | | | 24h |
| Cardbus CIS Pointer | | | 28h |
| Subsystem ID | | Subsystem Vendor ID | 2Ch |
| Expansion ROM Base Address | | | 30h |

TABLE 1-continued

| | | Reserved | | 34h |
|---|---|---|---|---|
| | | Reserved | | 38h |
| Max_Lat | Min_Gnt | Interrupt Pin | Interrupt Line | 3Ch |

Table 1 illustrates the layout of a type 00h predefined header portion of the 256-byte configuration space. Devices place any necessary device specific registers after this predetermined header in configuration space. All PCI compliant devices support the Vendor ID, Device ID, Command, Status, Revision ID, Class Code and Header Type fields in the header. The implementation of other registers in a Type 00h predefined header is optional (i.e., they can be treated as reserved registers) depending on device functionality. If a device supports a function that a register is concerned with, the device implements it in the defined location and with the defined functionality.

For further information relating to the configuration space header, its various fields, and a description of each of these fields, please refer to the PCI Local Bus Specification, Revision 2.1, Chapter 6, pages 185–218.

Since the detection and correction of a possible error in the configuration registers requires at least several PCI bus cycles, the Retry Generator 45 is provided by the present invention to block any new primary PCI bus accesses to the P2P 9 until the status of the configuration registers is verified.

Figure 5:
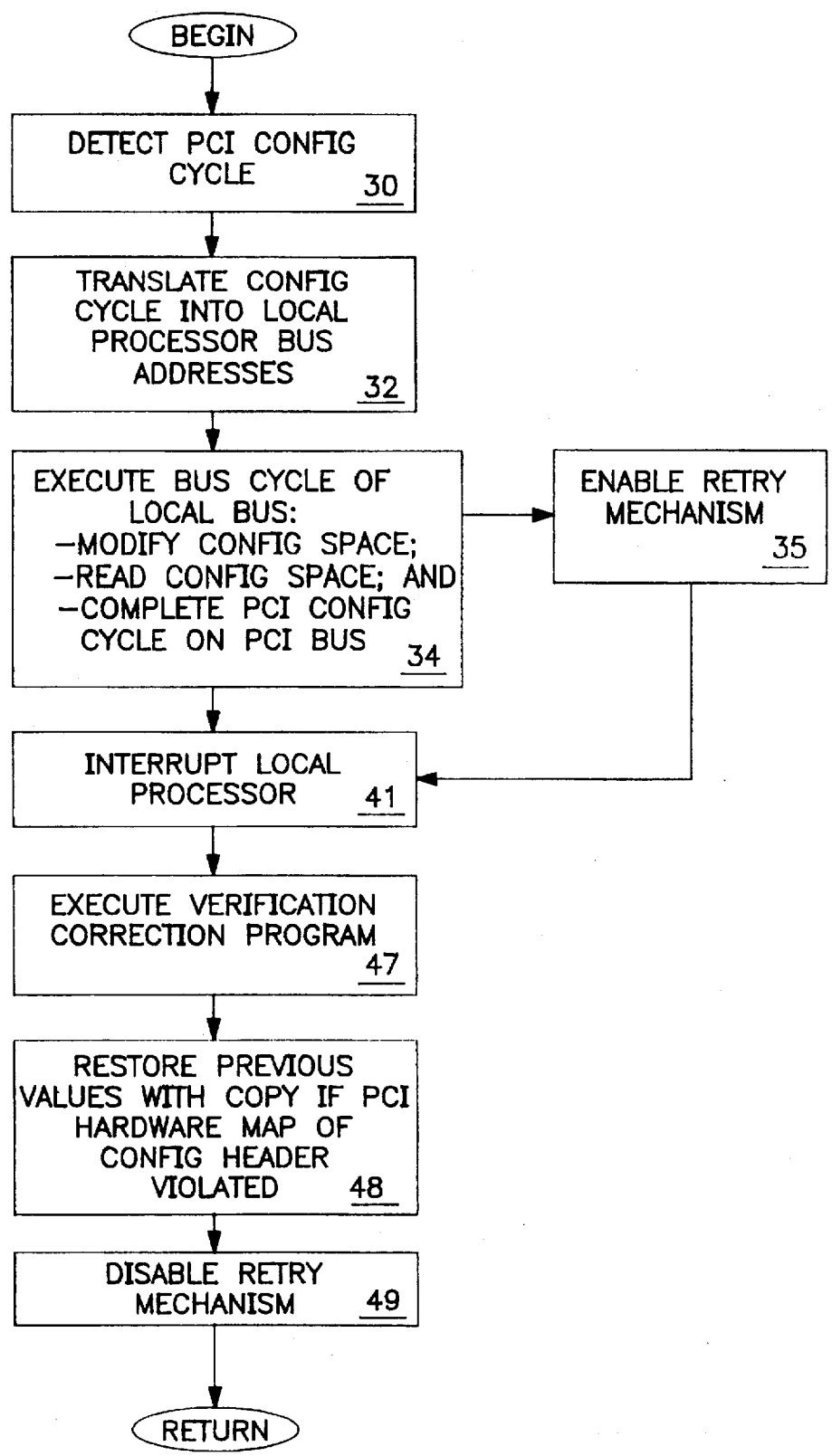
FIG. 5 illustrates the processing steps employed by the present invention.

FIG. 5 illustrates the processing steps employed by this embodiment of the present invention. Prior to the execution of the following processing steps, a copy of the configuration space (i.e., all the configuration registers) is made. This copy is made to insure that the configuration space may be restored if an unauthorized write has occurred to the configuration space. The processing steps, illustrated in FIG. 5, begin when a host or other bus master asserts a configuration cycle on the primary PCI bus 7. Second, a Device Select Detector 37 detects the PCI configuration cycle (processing step 30).

Subsequently, the Address Translator 35 translates this PCI configuration cycle into local processor bus 13 address space (i.e., the local memory addresses) (processing step 32). The present invention then executes the bus cycle on the local bus (processing step 34). This bus cycle may be a write to configuration space (i.e., a modify instruction) or a read cycle (i.e., a read configuration space instruction). After the bus cycle on the local bus is executed, the present invention completes the PCI configuration cycle on the PCI bus.

The present invention then enables the retry mechanism (processing step 35). The retry generator 45 disables the address translator 35 and asserts a retry cycle onto the primary PCI bus 7 for any subsequent request for access to the local processor bus 13. The retry generator 45 does not block accesses to the secondary PCI bus, as the retry generator 45 only blocks accesses to the local processor bus space.

A Retry cycle indicates to the host processor that the target device is not ready at this time to process the request or instruction. The Retry cycle is not an error or a disconnect because it instructs the host processor to try again at a later time.

Next, the Interrupt Generator 43 interrupts local processor 29 (processing step 46), which in turn executes verification and correction program code to verify that the configuration registers have been properly updated by the host processor 3 (processing step 47).

This verification and correction code (in processing step 47), conforms the configuration registers to the hardware map of the PCI Bus Protocol. This code will be described hereinafter with reference to Table 2.

Many of the registers defined in PCI Configuration space are a mixture of read/write (RW) bits, read only (RO) bits and even some read-clear (RC) bits. (A read-clear bit can be read or cleared by writing a 1 to that bit location. Writing a 0 to a read-clear bit has no effect.) A good example of these kinds of registers are the Command and Status registers in the PCI Configuration space. Since each of these registers is 16 bits, and they are aligned into a single 32 bit DWORD, it is possible for software to access both registers at once. This access contains all three types of bits (i.e., RW, RO, and RC bits). The present invention employs verification and correction code (e.g., firmware) that examines the data written to the register by the host and using the copy of the original data and a template showing which bits are of which type, updates the register correctly. Table 2 illustrates the format of an exemplary status/command register.

TABLE 2

Status/Command

| Original Data | Bit # | Type | Name |
|---|---|---|---|
| 0 | 31 | RC | Detected Parity Error |
| 0 | 30 | RC | Signalled SERR# |
| 1 | 29 | RC | Received Master Abort |
| 1 | 28 | RC | Received Target Abort |
| 0 | 17 | RO | Signalled Target Abort-Optional - Not Implemented by this example |
| 01 | 26–25 | RO | DEVSEL Timing |
| 0 | 24 | RC | Data Parity Error Detected |
| 1 | 23 | RO | Fast Back to Back Capable |
| 0 | 22 | RO | UDF Support |
| 0 | 21 | RO | 66 MHz Support |
| 0 | 20–10 | RO | Reserved |
| 1 | 9 | RW | Fast Back to Back Enable |
| 1 | 8 | RW | SERR# Enable |
| 0 | 7 | RO | Address Stepping |
| 0 | 6 | RW | Parity Error Response |
| 0 | 5 | RO | VGA Response |
| 0 | 4 | RW | MWI Enable |
| 0 | 3 | RO | Special Cycle |
| 1 | 2 | RW | Master Enable |
| 1 | 1 | RW | Memory Space |
| 1 | 0 | RW | IO Space |

The firmware includes a mask that shows which bits are RC (F1000000h) and a mask that shows which bits are RW (00000357h).

The firmware determines the new register value by employing the following boolean function:

New=RW*Written+RC*Current*/Written+/RW*/RC*Current

For example, if the Host writes a 1FF001FEh to the registers above (currently set to 32800307), the new register value is calculated as follows:

22800156h=00000357h*1FF001FEh (00000156h)

+F100000h*32800307*E00FFE01h (20000000h)

+FFFFFCA8*0EFFFFFF*32800307 (02800000h)

This result is then written to the storage location which is used for these registers, and the next transaction from the PCI bus can now be accepted.

As noted previously, in this embodiment, prior to a configuration cycle, the configuration space of the intelligent bridge 9 is stored in local memory 27. If it is determined by verification and correction software, executing on the local processor 29, that the protected configuration registers have been corrupted by a host processor configuration write, then the verification and correction software accesses the copy of the configuration space, disposed in local memory, and restores the original values in those configuration registers.

As noted above, the present invention restores the previous values of the configuration registers if the PCI hardware map of the configuration header space was violated by an unauthorized write (processing step 48). In this step, the copy of the configuration space is utilized for restoring the previous values.

The present invention then disables the retry mechanism so that subsequent requests for access to the local processor bus 13 are honored (processing step 49).

Figure 6:
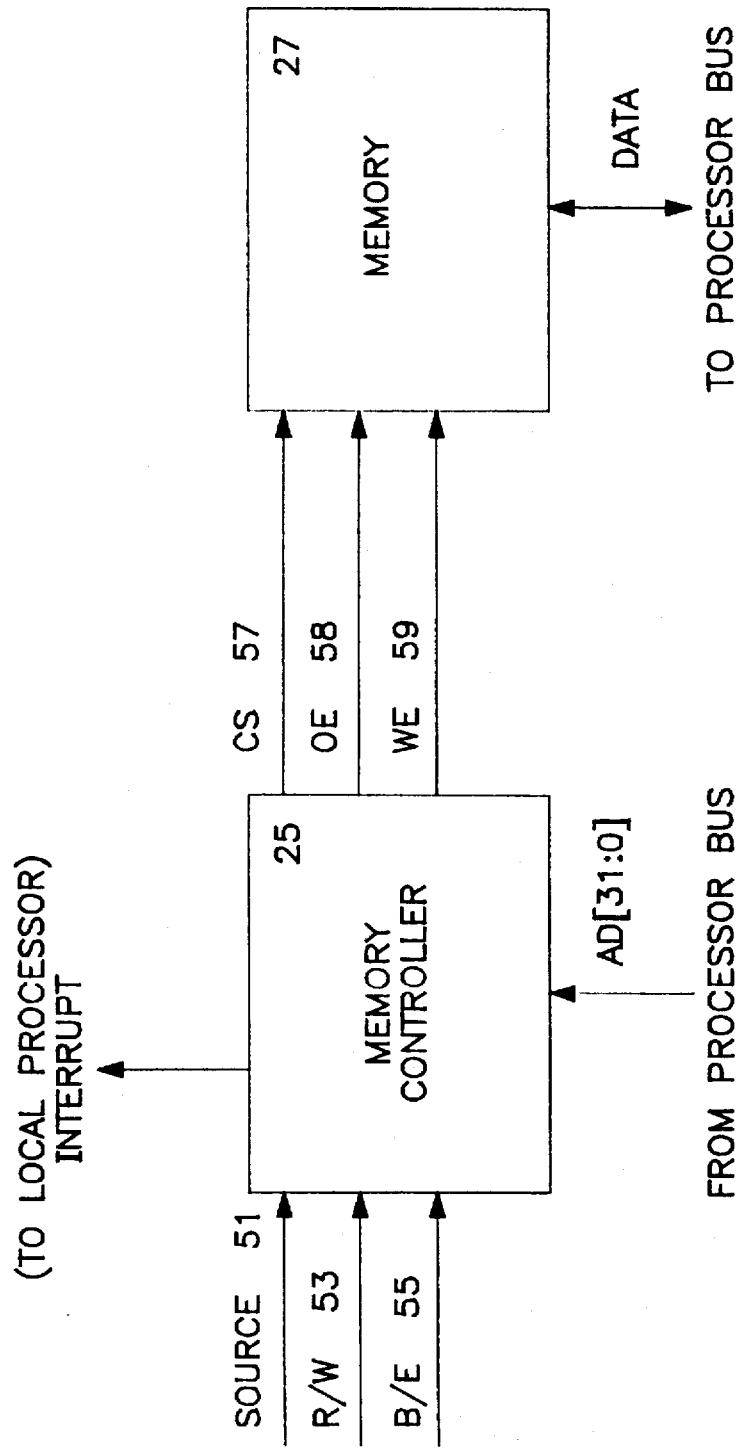
FIG. 6 illustrates an alternative embodiment of the present invention.

FIG. 6 illustrates an alternative embodiment of the present invention, where the key aspects of the invention are implemented primarily in the Memory Controller 25. In this embodiment, the Memory Controller 25 decodes the local bus memory addresses after they are mapped from the configuration cycle on the primary PCI bus 7. The Memory Controller 25 receives a source signal 51 that indicates to the Memory Controller 25 the source of the memory access (i.e., whether or not these accesses are initiated by the local processor 29 or by the host processor 3). The Memory Controller 25 also receives a read/write signal (R/W) 53, a set of byte enable (BE) signals 55, and all the bits of the memory addresses. The Memory Controller 25, in response to the signals, provides three signals to the local memory 27 (e.g., SRAM). These signals include a chip select (CS) signal 57, an output enable (OE) signal 58, and a write enable (WE) signal 59. The steps taken by the Memory Controller 25 to generate each of these signals will be described hereinafter with reference to FIGS. 7–9.

Memory controllers in prior art computer systems typically use only the upper bits of a memory address, and the lower bits of the memory address are provided directly to the local memory 27. However, the Memory Controller 25 of the present invention is provided all the bits in a memory address.

Figure 7:
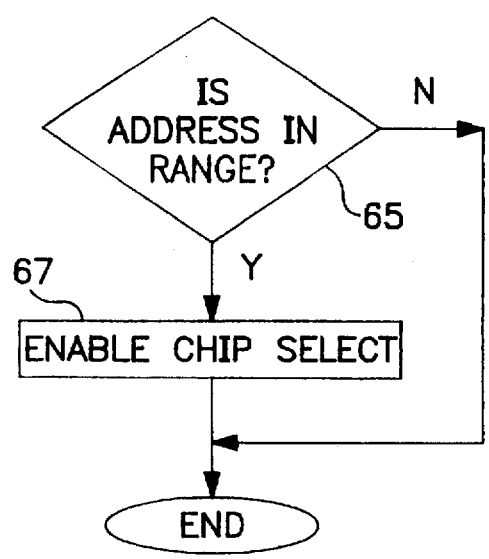
FIG. 7 illustrates the processing steps taken by circuitry in the memory controller to generator the chip select signal.

FIG. 7 illustrates the steps taken by circuitry in the Memory Controller 25 to generate the chip select (CS) signal 57. First, a determination is made whether or not the memory address is in a predetermined range (decision block 65). If NO, no further action is taken. If YES, enable the chip select (CS) signal (step 67).

Figure 8:
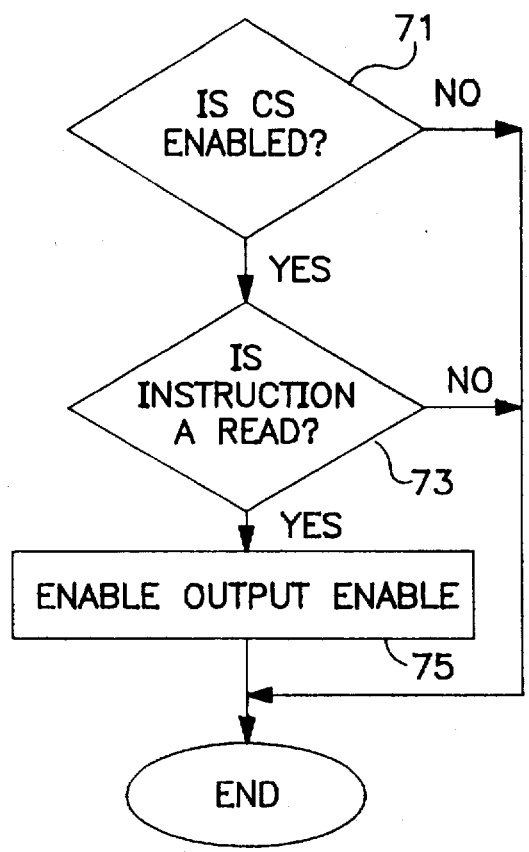
FIG. 8 illustrates the processing steps taken by circuitry in the memory controller to generate the output enable signal.

FIG. 8 illustrates the steps taken by circuitry in the Memory Controller 25 to generate the output enable (OE) signal 58. First, a determination is made whether or not the chip select (CS) signal 57 is enabled (decision block 71). If NO, no further action is taken. If YES, a further determination is made whether or not the command is a read command (decision block 73). If NO (i.e., the command is a write), no further action is taken. If YES, assert the output enable (OE) signal (step 75).

Figure 9:
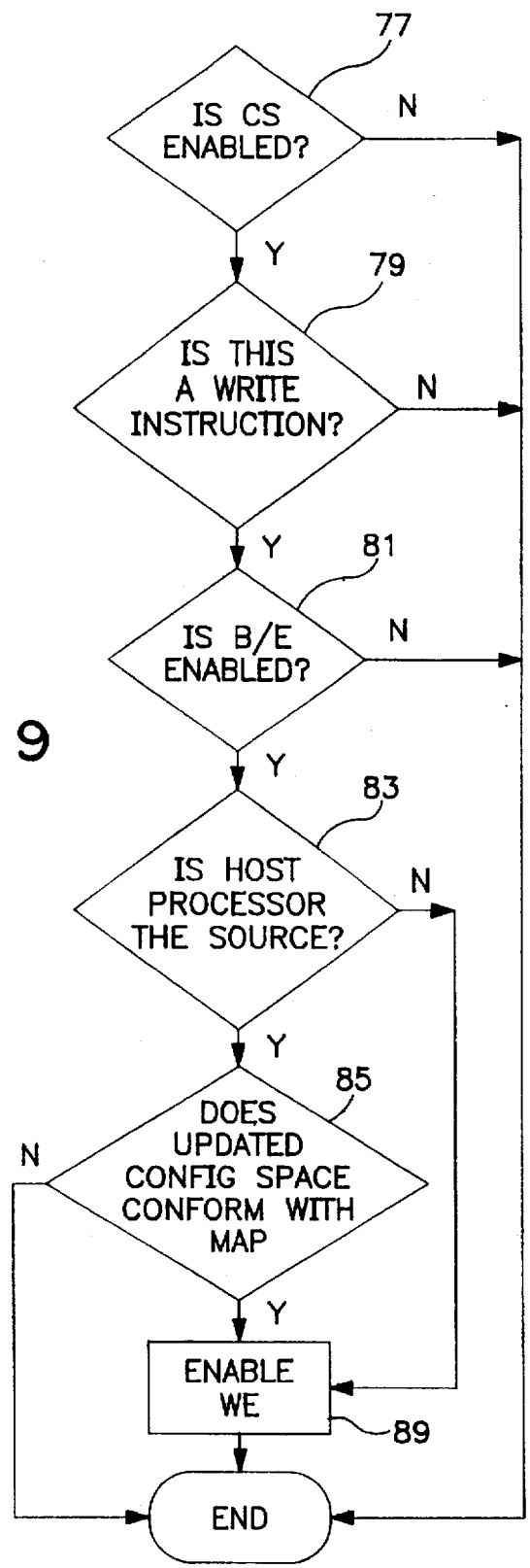
FIG. 9 illustrates the processing steps taken by circuitry in the memory controller to generate a write enable signal.

FIG. 9 illustrates the steps taken by circuitry in the Memory Controller 25 to generate a write enable (WE) signal 59. First, a determination is made whether or not the chip select signal 57 is enabled (decision block 77). If NO, no further action is taken. If YES, a further determination is made whether or not the instruction is a write instruction (decision block 79). If NO, no further action is taken. If YES, a further determination is made whether or not the byte enable signals 55 are asserted (decision block 81). If NO, no further action is taken.

If YES, a further determination is made whether or not the source of the instruction is the local processor 29 (decision block 83). If YES, assert the write enable signal 59 (step 89). If NO, a further determination is made whether or not the configuration space, as updated by the host processor, conforms with a predetermined hardware map (decision block 85). If the host processor attempts to modify the configuration registers in violation of the PCI Configuration Space hardware map (i.e., write to a protected configuration register), take no further action. If the host processor modified the configuration registers without violating the PCI Configuration Space hardware map, assert the write enable signal (step 89).

In this embodiment, a copy of the configuration space is not necessary since the present invention, as implemented in the memory controller 20, ignores a write instruction to a protected configuration register (i.e., the memory controller checks the predetermined hardware map set forth in the PCI bus protocol specification, before writing to configuration register). Thus, unlike the previous embodiment, the second embodiment does not store a copy of the configuration space into local memory before a configuration cycle is accepted by the intelligent bridge.

Figure 10:
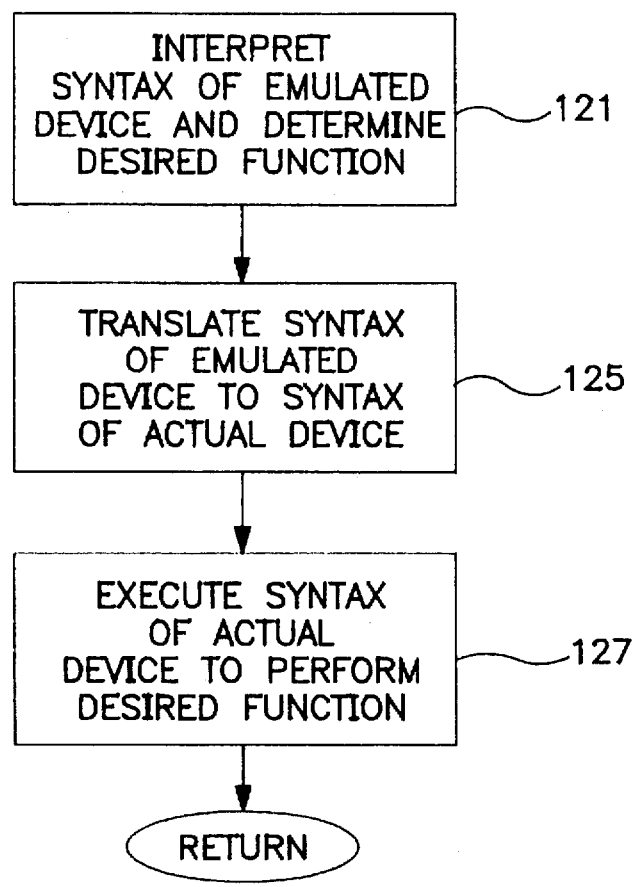
FIG. 10 illustrates the processing steps employed by the present invention for providing virtual functions via a multi-function intelligent bridge.

FIG. 10 illustrates the processing steps employed by the present invention to enable virtual functions (i.e., to emulate the functionality of other devices) through a multi-function intelligent bridge. As noted previously, the present invention allows a non-PCI compliant device 15 to interface to a PCI compliant bus via the P2P processor 9. The present invention employs emulation software, executed by the local processor 29, that translates the commands of a device driver that is not understandable to the non-PCI compliant device 15. The emulation software, which may be implemented in microcode (e.g., firmware), translates the command set of the device driver of the emulated device into commands that are understandable to the non-PCI compliant device 15.

Specifically, the present invention executes emulation program code on the local processor 29 to interpret the syntax of the emulated device and to determine the desired function (processing step 121). In this step, the present invention decodes a command from the device driver, associated with the emulated device and determines the function desired (e.g., for a SCSI controller, a first command may instruct a SCSI disk drive to write information to a particular sector while a second command may instruct the SCSI disk drive to read from a particular sector).

Next, the present invention translates the syntax of the emulated device to syntax of the actual device (processing step 125). In other words, the emulation software of the present invention determines the necessary commands, which are understandable by the non-PCI compliant device 15, that will achieve the desired function, as determined in processing step 121.

Last, the present invention executes the syntax (e.g., commands) for the actual device. The actual device then performs the desired function in response to the syntax (processing step 127).

This sequence of processing steps for providing virtual functions via the multi-function intelligent bridge, may be executed after step 49 of FIG. 5.

The mapping of the syntax of the emulated device to the syntax of the actual device may be trivial (e.g., doing nothing) because the particular function is implemented in hardware (e.g., writing a particular bit in a register). If the mapping between the syntax of the emulated device and the syntax of the actual device is not straightforward, the emulation code may include multiple processing steps to accurately emulate the command of the emulated device (e.g., a particular command of the graphics driver). For example, a particular read and write command of the emulated device may need to be directed to a different memory location, or one command of the emulated device may translate or map into a number of different commands of the actual device. A specific example of emulating a functionality is disclosed in a previously filed patent application entitled, "A Circuit and Method for Emulating the Functionality of an Advanced Programmable Interrupt Controller", Ser. No. 08/576,511 attorney docket number 042390.P3299, filed on Dec. 20, 1995.

A variety of hardware and software functions have been described herein. Depending upon the implementation, many of the hardware functions may be emulated using software. Likewise, software functions may be performed using hardware components having hardwired circuitry configured to perform the functions. In other implementations, some of the hardware or software functions may be configured using firmware or other computer system implementation technologies.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. An intelligent I/O circuit for interfacing a device adapted to operate with a first bus protocol to an external bus having a second bus protocol, said intelligent I/O circuit having a plurality of configuration registers for storing configuration information, said intelligent I/O circuit comprising:

a) a local processor bus having the first bus protocol;

b) a memory controller, coupled to the local processor bus, for controlling access to a local memory; said local memory including first program means for translating a second bus protocol configuration cycle into a first bus protocol configuration cycle and, said first bus protocol configuration cycles understandable by the device;

second program means for providing appropriate handshake signals to the external bus;

third program means for verifying that the plurality of configuration registers have been modified by the external agent in accordance with a predetermined hardware map, said map defined by the second bus protocol, and for restoring those registers that have been modified in violation of the hardware map, said predetermined hardware map specifying non-writable bits in the intelligent I/O circuit;

c) a local processor, coupled to the local processor bus, for executing program instructions; and d) an address translation unit for coupling the external bus to the local processor bus and for providing an interface between the external bus and the local processor bus.

2. The intelligent I/O circuit of claim 1 wherein the address translation unit, the memory controller, the local processor, the local processor bus, and the bridge circuit are integrated into an Intel 80960 RP chip.

3. The intelligent I/O circuit of claim 1 wherein the address translation unit further includes:

means, coupled to the external bus, for detecting that a configuration cycle on the external bus is directed to the intelligent bridge, said configuration cycle generated by the external bus agent;

means, coupled to the detection means, for generating an interrupt to the local processor after configuration is completed; and means, coupled to the interrupt generating means, for asserting a retry on the external bus until the local processor completes executing the correction and verification program, said program executing in the local processor.

4. An intelligent I/O circuit for emulating functions and providing bus capability to a non-compliant device, said intelligent I/O circuit comprising a memory controller, said memory controller including:

a) means, responsive to a source signal, for generating a first signal indicative of the source of a configuration instruction;

b) means responsive to a read/write signal, a plurality of byte enable signals, a plurality of address signals, and the first signal for selectively controlling accesses to a memory;

c) means, coupled to the means for selectively controlling the memory, for generating an interrupt to a local processor;

d) means for detecting a current state of a plurality of configuration registers;

e) means for storing the current state of these configuration registers;

f) means for determining whether or not the configuration registers are accessible by a host processor; and g) means for restoring a previous value into a configuration register that is written by the host processor in violation to a predetermined hardware map.

5. An intelligent I/O circuit for emulating functions and providing bus capability to a non-compliant device, said intelligent I/O circuit comprising at least one configuration register and an address translation unit, said address translation unit including:

a) means for detecting that a configuration cycle on the external bus is directed to the intelligent I/O circuit;

b) means, coupled to detection means, for generating an interrupt to a local processor, allowing the configuration register to be modified by an external agent;

c) means, coupled to the interrupt generating means, for asserting a Retry on the external bus until the local processor completes its correction and verification of the configuration register; and d) software means, disposed in a local memory, for verifying and restoring the configuration register after modification by the external agent.

6. An intelligent I/O circuit for interfacing a device compliant with a first bus protocol to a second bus protocol, said intelligent I/O circuit having a plurality of configuration registers for storing configuration information, said intelligent I/O circuit comprising:

a) an address translation unit for translating bus cycles between the first bus protocol and the second bus protocol, said address translation unit further providing a source signal;

b) a local processor, coupled to the local processor bus, for executing program instructions;

c) a local memory including first program means for checking a predetermined hardware map as defined by second bus protocol, and for determining, based on the hardware map, whether or not a target configuration register is accessible by an external agent;

a second program means for storing a current state of the configuration registers;

a third program means for determining whether the configuration registers are accessible by an external agent based upon a predetermined hardware map; and a fourth program means for storing a previous value into a configuration register that is written by an external agent in violation of the predetermined hardware map; and d) a memory controller, coupled to the local processor bus, for controlling access to the local memory.

7. The intelligent I/O circuit of claim 6 wherein the hardware map is defined by the PCI bus protocol.

8. The intelligent I/O circuit of claim 6 further comprising a bridge circuit for interfacing the second bus to a third bus.

9. The intelligent I/O circuit of claim 6 wherein the second bus protocol is a PCI bus protocol.

10. The intelligent I/O circuit of claim 6 wherein the local processor is an Intel 80960 JF processor chip.

11. The intelligent I/O circuit of claim 6, wherein the memory controller further includes:

means, responsive to a read/write signal, a byte enable signal, a plurality address signals, and a first signal for selectively controlling accesses to a memory;

means, coupled to the means for selectively controlling the memory, for generating an interrupt to a local processor; and program means for determining whether or not a target configuration register is accessible by the external agent.

* * * * *